United States Patent
Wagenknecht et al.

(10) Patent No.: US 10,193,992 B2
(45) Date of Patent: Jan. 29, 2019

(54) REACTIVE API GATEWAY

(71) Applicant: Accenture Global Solutions Limited, Dublin (IE)

(72) Inventors: Dominik Wagenknecht, Vienna (AT); Matthew D. Lancaster, Morrisville, NC (US); Oscar Renalias, Espoo (FI)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/469,147

(22) Filed: Mar. 24, 2017

(65) Prior Publication Data

US 2018/0278705 A1    Sep. 27, 2018

(51) Int. Cl.
| | | |
|---|---|---|
| G06F 15/16 | (2006.01) | |
| H04L 29/08 | (2006.01) | |
| G06F 9/54 | (2006.01) | |

(52) U.S. Cl.
CPC .............. *H04L 67/28* (2013.01); *G06F 9/546* (2013.01); *H04L 67/141* (2013.01); *H04L 67/10* (2013.01)

(58) Field of Classification Search
CPC ....... H04L 67/02; H04L 67/10; H04L 67/141; H04L 41/048; H04L 41/28; H04L 41/5051; H04L 41/5058; H04L 65/102; H04L 67/28; G06F 9/54; G06F 9/547; G06F 9/546
USPC ........................................................ 709/227
See application file for complete search history.

(56) References Cited

U.S. PATENT DOCUMENTS

| | | | |
|---|---|---|---|
| 6,968,390 B1 * | 11/2005 | Chavez, Jr. ......... | G06F 11/2028 709/224 |
| 7,272,662 B2 | 9/2007 | Chesais et al. | |
| 7,280,530 B2 | 10/2007 | Chang et al. | |
| 7,363,349 B2 | 4/2008 | Friedman et al. | |
| 8,613,070 B1 * | 12/2013 | Borzycki ............ | G06F 21/6218 726/8 |
| 2001/0039562 A1 * | 11/2001 | Sato ................. | G06F 17/30545 709/202 |
| 2003/0140282 A1 | 7/2003 | Kaler et al. | |
| 2003/0214943 A1 | 11/2003 | Engstrom et al. | |
| 2005/0149609 A1 | 7/2005 | Lamport | |

(Continued)

OTHER PUBLICATIONS

Australian Examination Report in Australian Application No. 2017232151, dated Mar. 2, 2018, 5 pages.

(Continued)

*Primary Examiner* — Ruolei Zong
(74) *Attorney, Agent, or Firm* — Fish & Richardson P.C.

(57) ABSTRACT

A system for processing application programming interface (API) calls and event messages may include a gateway subsystem and an events hub. The gateway subsystem can route API calls submitted by user agents connected to the gateway subsystem to appropriate service subsystems. The events hub can receive event messages from at least some of the service subsystems and publish the received event messages for consumption by one or more consuming subsystems including the gateway subsystem. A first published event message may specify a first user and the the gateway subsystem can (i) determine every user agent that is associated with the first user and that is currently connected to the gateway subsystem and (ii) transmit information that represents the first published event message to every user agent that is determined to be associated with the first user and currently connected to the gateway subsystem.

22 Claims, 5 Drawing Sheets

(56) References Cited

U.S. PATENT DOCUMENTS

| | | | |
|---|---|---|---|
| 2005/0223391 A1 | 10/2005 | Mckinley et al. | |
| 2005/0267896 A1 | 12/2005 | Goodman et al. | |
| 2005/0278410 A1* | 12/2005 | Espino | H04L 67/2823 |
| | | | 709/201 |
| 2006/0080596 A1* | 4/2006 | Bhogal | G06F 9/542 |
| | | | 715/213 |
| 2006/0149743 A1 | 7/2006 | Mouline et al. | |
| 2007/0067409 A1* | 3/2007 | Eslambolchi | H04L 63/0281 |
| | | | 709/217 |
| 2007/0214355 A1 | 9/2007 | Lamport | |
| 2009/0006167 A1 | 1/2009 | Toussaint et al. | |
| 2011/0320550 A1* | 12/2011 | Lawson | G06F 9/542 |
| | | | 709/206 |
| 2012/0079570 A1* | 3/2012 | Fu | H04L 9/3213 |
| | | | 726/5 |
| 2014/0032707 A1* | 1/2014 | Doshi | G06F 9/542 |
| | | | 709/217 |
| 2014/0040979 A1* | 2/2014 | Barton | H04L 63/20 |
| | | | 726/1 |
| 2014/0081901 A1* | 3/2014 | Szymczak | G06F 9/44526 |
| | | | 707/601 |
| 2015/0207857 A1* | 7/2015 | Horton | H04L 67/16 |
| | | | 709/204 |
| 2017/0034161 A1* | 2/2017 | Isola | H04L 63/145 |

OTHER PUBLICATIONS

Australian Examination Report in Australian Appln No. 2017232151, dated Aug. 13, 2018, 11 pages.

* cited by examiner

REACTIVE API GATEWAY

BACKGROUND

Websites and client applications frequently interact with remote servers that provide a range of services for users. For example, a typical e-commerce website may include a user authentication service that logs users into and out of personal accounts with the website, an inventory presentation service that identifies products to showcase to a user in a webpage, and a purchasing service that allows users to complete transactions to purchase products from the website. In some instances, client devices interact with the services using application programming interface (API) calls. The API calls can contain requests for the services to perform certain operations offered by the services.

Although a service platform may offer a collection of services to provide a complete user experience (e.g., user authentication and account management service, inventory selection service, purchasing service), in practice, services are not always tightly integrated and may have been developed at least partially independently of each other over an extended period of time.

SUMMARY

This specification generally describes a reactive API gateway that can be implemented in a service platform to manage connections between a collection of service subsystems and user agents at one or more client computers. The API gateway may be arranged as a layer between the user agents and the service subsystems so that the gateway proxies API calls received from the user agents and routes the calls to appropriate service subsystems that have been designated for handling such calls. After a service subsystem has processed an API call and performed any requested operations, the subsystem may generate an event message that indicates a result of having processed the API call, such as a notification of a data change that resulted from one or more operations associated with the API call. In some implementations, an event may also be triggered for other reasons (e.g., as a result of some routine processing not directly connected to an API call) or not at all (e.g., a pure read API call could be deemed as not noteworthy such that a service does not generate an event message for the API call). If the service generates an event message, it may be provided to a messaging service that publishes the message for one or more consuming services, including the reactive API gateway. Because the API gateway manages connections with users across one or more channels, the gateway is configured to push an event message published by the messaging service to one, some, or all of the active channels for a user that the message is intended for.

Some implementations of the subject matter disclosed herein include a computer-implemented method, e.g., for processing application programming interface (API) calls. The method can be performed by a system of one or more computers, which may be distributed in one or more locations. For example, the system may be a distributed reactive API gateway. In the method, the system may establish connections with multiple user agents at one or more client computers. The system may receive an API call from a first user agent of the multiple user agents to which the system is connected. The system may route the received API call to a particular service subsystem of the multiple service subsystems that are registered with the system. The system may identify an event message that is addressed to a first user. In some instances, the system may determine that it is connected to multiple user agents associated with the first user. In response to identifying the vent message that is addressed to the first user and determining that the system is connected to the multiple user agents associated with the first user, the system may provide the event message to each of the multiple user agents associated with the first user.

These and other implementations can optionally include one or more of the following features.

The identified event message can be generated as a result of an operation performed by the particular service subsystem based on the received API call that was routed to the particular service subsystem.

Identifying the event message that resulted from the operation performed by the particular service subsystem can include obtaining the event message from an events hub that is configured to interact with each of the multiple service subsystems and to publish event messages that originated from the particular service subsystem for consumption by one or more consuming subsystems.

The system is an API gateway that is configured as a reverse proxy to intercept API calls directed to the plurality of service subsystems and to route each intercepted API call to a respective service subsystem that is determined to correspond to the intercepted API call.

The multiple user agents that are associated with the first user can include the first user agent and a second user agent that is distinct from the first user agent.

The first user agent and the second user agent can be provided on different client computers.

At least one of the first user agent or the second user agent can be a web browser application on a mobile client computer or a desktop client computer.

The system can include multiple computers in a distributed architecture that includes a plurality of nodes of computers. Determining that the system is connected to multiple user agents associated with the first user can include performing a consensus technique to achieve strict consistency or eventual consistency of user agent data among the plurality of nodes.

Determining that the system is connected to multiple user agents associated with the first user can include performing a lookup in a connections log that associates each active user-agent connection with a corresponding user identifier that indicates which user is associated with the active user-agent connection.

Establishing connections with the multiple user agents can include establishing connections with one or more user agents that are associated with a second user. Further the method performed by the system can include identifying that the second user has been added to a blacklist of users that are blocked from maintaining connections with the system and, in response to identifying that the second user has been added to the blacklist, automatically terminating the connections with the one or more user agents that are associated with the second user.

The API call can include a request to store form field data that has been partially entered at the first user agent, but that has not yet been submitted.

In some implementations, one or more computer-readable media (e.g., non-transitory computer-readable media) may be encoded with instructions that, when executed by one or more processors, cause the one or more processors to perform any of the computer-implemented methods disclosed herein. In some implementations, the one or more computer-readable media may be part of a computing system that further includes the one or more processors.

Some implementations of the subject matter disclosed herein include a computing system, e.g., a system for processing API calls and event messages. The system can include a gateway subsystem and an events hub. The gateway subsystem can be configured to route API calls submitted by user agents connected to the gateway subsystem to appropriate service subsystems of a set of registered service subsystems. The events hub can be configured to receive event messages from at least some of the set of registered service subsystems and to publish the received event messages for consumption by one or more consuming subsystems including the gateway subsystem. At least a first published event message that is consumed by the gateway subsystem may identify a first user to whom the message is addressed. The gateway subsystem can be further configured to (i) determine every user agent that is associated with the first user and that is currently connected to the gateway subsystem and (ii) transmit information that represents the first published event message to every user agent that is determined to be associated with the first user and currently connected to the gateway subsystem.

These and other implementations can optionally include one or more of the following features.

The gateway subsystem can be further configured to identify a second user that has permission to access an online session of the first user, and based on identifying that the second user has permission to access the online session of the first user, transmit information that represents the first published event to one or more user agents that are determined to be associated with the second user and that are currently connected to the gateway subsystem.

The second user may be a customer support representative or an information technology specialist.

The information that represents the first published event message can be the first published event message.

Some implementations of the subject matter described herein may, in certain instances, achieve one or more of the following advantages. First, the reactive API gateway centralizes interactions between client user agents and a service platform in which the gateway is deployed. Therefore, individual service subsystems need not maintain or track connections with user agents connected to it or related services in the platform. Moreover, the API gateway may associate each active connection to a user agent with a particular user or user account. With this context, the API gateway can readily push event messages pertaining to a given user to each user agent associated with the user, thereby allowing a user to connect to the service platform on multiple user agents or channels while sharing a session across each channel. For example, if a user submits an API call to post data to a particular service, the result of the transaction can be automatically pushed to the user on each channel by which the user is currently connected to the platform. In some instances, session state data can be automatically updated in near real-time across multiple channels as the user modifies a session state on any one of the channels. In some implementations, the reactive API gateway can be integrated into an existing service platform with relatively little disruption to the underlying services offered by the platform. Additional service subsystems can be registered and configured to interact with the reactive API gateway by complying with a minimal set of design constraints. Additional features and advantages will be appreciated by one of skill in the art based on the description, the claims, and the figures.

DESCRIPTION OF DRAWINGS

Like reference numbers and designations among the various drawings indicate like elements.

DETAILED DESCRIPTION

This specification describes systems, methods, devices, and other techniques for processing application programming interface (API) calls using a reactive API gateway. The reactive API gateway may be integrated in a services platform as a layer above one or more service subsystems that each provides a respective service to clients of the services platform. The reactive API gateway manages connections with the clients and routes API calls from the clients to appropriate ones of the service subsystems. Additionally, the reactive API gateway may consume messages from the service subsystems and push the messages to any clients that are connected to the reactive API gateway which are determined to be associated with a user specified in the message.

As such, in some implementations, the reactive API gateway can facilitate dynamic user sessions for users who are connected to the services platform via one or more channels, e.g., users who connect to the platform through multiple user agents on one or more clients at the same time. Because the reactive API gateway manages client connections on behalf of the backend service subsystems, and is aware of every active connection associated with a given user across one or more channels, the gateway can push messages to the user on each channel, such as messages that cause the clients to automatically update a client state (session state) for each channel and/or messages that cause the clients to update user interfaces associated with each channel. For example, a user may log into an account on a banking website on a smartphone and a desktop computer. The banking website may offer a variety of services to the user such as mobile deposits, wire transfers, and bill payment services. The banking website may provide a reactive API gateway that allows the user to access any of these online services. If the user, for example, initiates a wire transfer on the desktop computer, the reactive API gateway may route the wire transfer request (e.g., an API call) to the appropriate backend service that handles wire transfer operations. Once the service completes the wire transfer, it may generate an event message indicating completion of the wire transfer and updated account balances that have resulted from the transfer. The reactive API gateway identifies this message and pushes the message to both the user's mobile device and desktop computer that have active connections with the banking platform. In this manner, the user may automatically be alerted on both channels (i.e., on both the desktop computer and the smartphone) that the wire transfer has completed and the account balances presented to the user may be automatically updated as a result. Additional examples are discussed with respect to the figures and will be appreciated to those of skill in the art in view of this specification.

Figure 1:
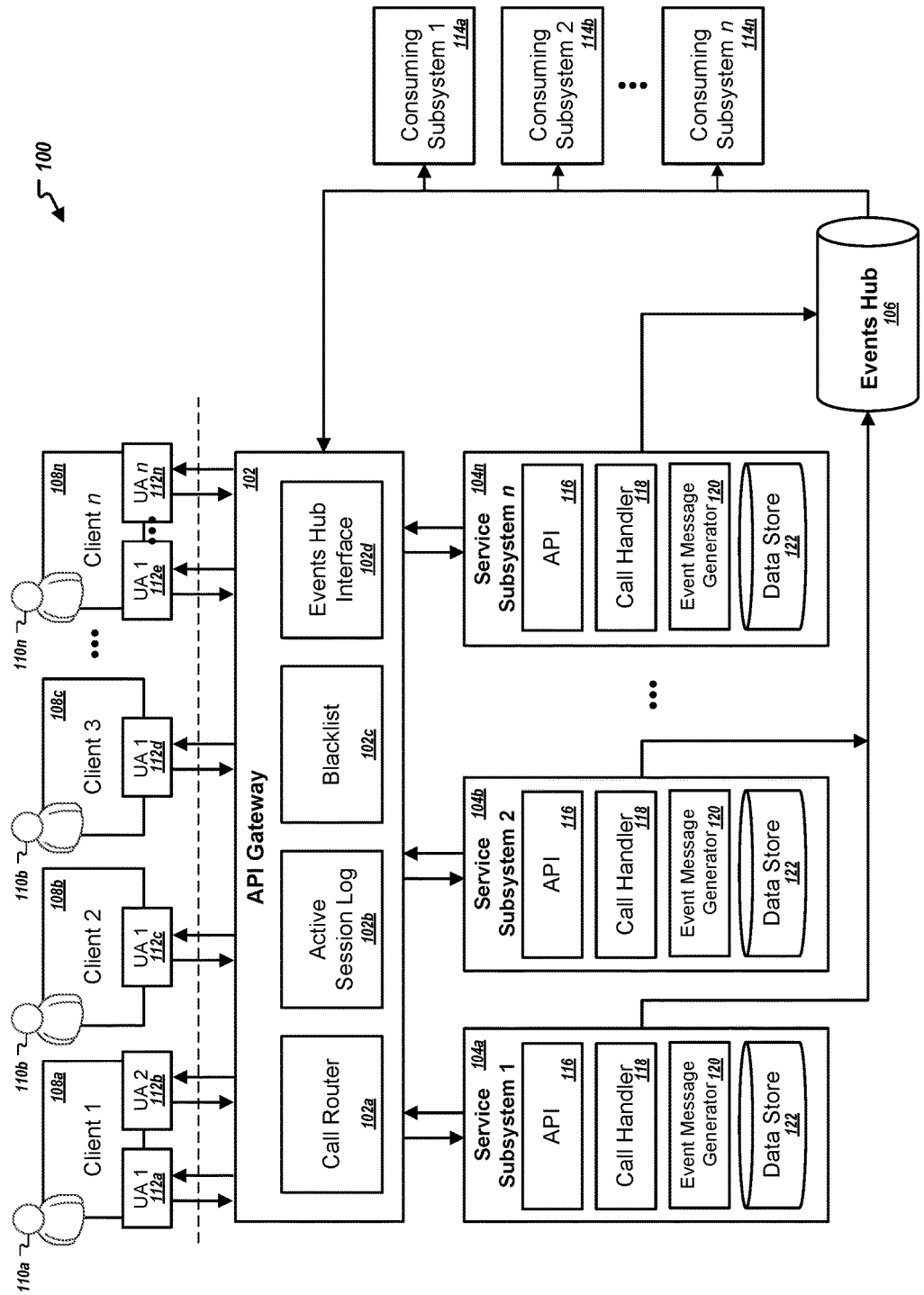
FIG. 1 is a block diagram of an example environment of a reactive API gateway.

FIG. 1 is a block diagram of an example environment 100 of a reactive API gateway 102. In general, the reactive API gateway 102 can provide a front end to a services platform that provides one or more services on service subsystems 104a-n. The API gateway 102 maintains connections with user agents 112 at one or more client computers 108a-n, routes API calls from the user agents 112 to the appropriate service subsystems 104a-n, consumes messages published by a messaging service on an events hub 106, and pushes messages to the user agents 112.

The API gateway 102 may be implemented on one or more computers in one or more locations. Likewise, the service subsystems 104a-n and events hub 106 may be implemented on one or more computers in one or more locations. In some implementations, two or more of the components 102, 104a-n, and 106 may be implemented on the same computers. In some examples, the services platform is a platform for a website or a cloud-based application. In some examples, the platform may provide services that are used in multiple contexts, such as services utilized by customer-facing websites and mobile applications, as well as enterprise applications used within an organization, such as customer support, information technology, or enterprise resource planning software for an organization.

Client computers 108a-n may communicate with the API gateway 102 over a network, e.g., a packet-switched network such as the Internet or a private intranet network. In some implementations, the client computers 108a-n are external clients of the platform in which the API gateway 102 operates. A client computer 108 may be any type of user device that is capable of establishing a connection with the API gateway 102 and exchanging messages with the gateway 102. For example, the client computer 108 may be a smartphone, a tablet computer, a notebook computer, a desktop computer, or a wearable computing device.

Each client computer 108 is associated with one or more users 110. In some implementations, the user 110 of a client computer 108 is identified by logging into an account belonging to the user 110 on the client computer 108. Moreover, a particular user 110 may be associated with multiple client computers 108. For example, as illustrated in FIG. 1, user 110a is associated only with the first client computer 108a, but user 110b is associated with both the first and second client computers 108b and 108c such as a smartphone and a desktop computer.

The client computers 108a-n are each configured to establish a connection with the API gateway 102 via one or more user agents 112. A user agent 112 is a client module that has established an independent connection with the API gateway 102. Each user agent 112 connected to the API gateway 102 provides a respective channel for communications between a client computer 108 and the API gateway 102. For example, user 110a has established dual channels of communication with API gateway 102 through a first user agent 112a and a second user agent 112b. The connections between user agents 112a, 112b may be established at substantially the same or different times, and may be maintained concurrently or at different times. For instance, the user 110a may establish separate connections with the API gateway 102 on independent channels via a web-based interface in a web browser and also via an application-based interface in a dedicated client application installed on the client 108a. Connections may be established between the API gateway 102 and user agents 112 in any suitable manner, e.g., using web sockets, HTTP streaming (e.g., long polling), or HTTP server-sent events.

In some instances, when a user 110 is connected to the API gateway 102 on multiple channels (e.g., via multiple user agents 112), the system provides a shared session across each of the channels. In a shared session, each connected user agent 112 can update a session state that affects the session on each connected user agent 112. Thus, if a user 110n is filling a form by typing data into form fields in a website using a first user agent 112e, then updated session state data may be pushed to other user agents 112f-n on the same shared session to cause the data typed in the first user agent 112e to appear in the same fields that are presented in the shared session on other user agents 112f-n. Alternatively, private sessions may be established between user agents 112 and gateway 102, even across multiple channels associated with the same user 110. In a private session, session state data is not shared across channels. Nonetheless, in some implementations, activity in one private session may affect other private sessions, e.g., if the activity results in a change to a backend service parameter that is not tied to a particular user session. For example, if a user wires money in a private session from one savings account to another, after the transaction is complete, the API gateway 102 may push an event message to the user agent connected in a different private session indicating that a wire transfer has been completed and showing updated account balances.

The API gateway 102 can be configured to perform a number of tasks. In some implementations, the gateway 102 includes a call router 102a, an active session log 102b, a blacklist 102c, and an events hub interface 102d. The components 102a-d facilitate internal processing and interactions with user agents 112, service subsystems 104a-d, and events hub 106.

The call router 102a is configured to receive API calls, or other requests, from user agents 112 connected to the API gateway 102, and to pass each received API call to a corresponding service subsystem 104 to which the call is directed. For example, a website may have a first service on service subsystem 1 (104a) that authenticates users and logs users into personal accounts on the website. Service subsystem 2 (104b) may provide a different, second service that, e.g., allows an authenticated user to submit bids in an online auction. If the API gateway 102 receives an API call to log into a user account, the gateway 102 may analyze the call and determine that it corresponds to a service on service subsystem 1 (104a). Accordingly, the API gateway 102 forwards the call to service subsystem 1 (104a). If the API gateway 102 receives an API call that represents a bid in an online auction, the gateway 102 may analyze the call and determine that it corresponds to a service on service subsystem 2 (104b). Accordingly, the API gateway 102 forwards the call to service subsystem 2 (104b). In this respect, the API gateway 102 and call router 102a may be configured as a reverse proxy to the various backend services on service subsystems 104a-n. The gateway 102 establishes and maintains connections with user agents 112 at one or more client computers 108a-d on behalf of the service subsystems 104a-n. Because connections are managed by the API gateway 102, the respective service subsystems 104a-n need not establish or maintain individual connections with the user agents 112. The gateway 102 can thus intercept calls from connected user agents 112 and route them to the appropriate service subsystem 104 corresponding to the calls.

In some implementations, the call router 102a includes a call routing map that correlates registered API calls with an indication of which service subsystem 104 is responsible for processing the calls. At runtime, when the call router 102a identifies a call from a user agent 112, the call router 102a performs a lookup operation in the call routing map to identify which service subsystem 104 the call should be forwarded to. In some implementations, the call routing map further defines rules that can be applied to determine which service subsystem 104 a received API call should be forwarded to. When the call router 102a receives an API call, it parses the received call and applies the routing rules to determine which service subsystem 104 to forward the call to.

After the gateway 102 forwards an API call to an appropriate service subsystem 104, the service subsystem 104 processes the call, provides its result and may generate an event message that indicates a result of processing the call. In some implementations, each of the service subsystems 104a-n need only comply with a minimal set of requirements to interact with the reactive API gateway 102. For example, a compliant service subsystem 104 may register with the API gateway 102 by providing a list of calls or rules for routing calls to the service subsystem 104. A compliant service subsystem 104 may also output event messages in a format that can be processed by the events hub 106. However, the services offered by a compliant service subsystem 104 and the particular operations that the subsystem 104 is configured to perform are generally not restricted by the API gateway 102. In some instances, a service subsystem 104 may process certain API calls without generating any event messages that are reported to the events hub 106 and consumed by the reactive API gateway 102 or other services. As such, the system can be extensible such that additional service subsystems can readily be registered with and, configured to interact with, the reactive API gateway 102.

Each service subsystem 104 may be independently programmed to perform different operations and services. For illustration, FIG. 1 shows one example structure that generally applies to a set of service subsystems 104a-n. Each service subsystem 104 in the set 104a-n provides an API 116, a call handler 118, an event message generator 120, and a data store 122. The API 116 defines calls that can be made to the service subsystem 104 to cause performance of one or more operations for one or more services offered by the service subsystem 104. The API 116 may be publicly exposed to allow third-parties, e.g., client computers 108a-n, to call on the service subsystem 104 to perform specified operations.

The operations that a particular service subsystem 104 is configured to perform may vary according to the types of services offered by the particular subsystem 104. For example, a service subsystem 104 that provides a user log-in or authentication service may be configured to perform account log-in and log-out operations, whereas a different service subsystem 104 that provides a hotel-room booking service may be configured to perform booking, price comparison, and user review operations.

The call handler 118 of each service subsystem 104 is configured to parse a received API call, e.g., an API call that originated from a user agent 112 and that was forwarded to the service subsystem 104 by the call router 102a of API gateway 102, and to perform an operation specified by the API call in accordance with any parameters identified in the call. For instance, an API call may identify a particular operation that is requested to be performed and parameters for the operation such as user credentials for an account log-in operation or financial account identifiers for wire transfer operation. Data pertaining to the services offered by a service subsystem 104 can be stored in a data store 122. For example, a banking website may maintain secure databases indicating user account balances and an online retailer may maintain databases indicating inventory levels and pricing for products offered by the retailer.

In some implementations, each of the service subsystems 104a-n further includes an event message generator 120. The event message generator 120 is configured to generate event messages that are provided directly to one or more consuming subsystems 114a-n and the reactive API gateway 102, or that are provided indirectly to one or more consuming subsystems 114a-n and the reactive API gateway 102 via the events hub 106. An event message generally indicates the result of one or more operations performed by a service subsystem 104. For instance, in response to an API call to post data entered into a form field on a webpage, the call handler 118 may write the entered data into data store 122 and the event message generator 120 may output an indication that the post operation has been carried out successfully. In some implementations, the event message includes computer code that, when executed, cause performance of operations specified in the computer code. An event message may include instructions for the user agent 112 at a client computer 108 to update information presented to a user or to display a pop-up window that shows the result of the requested operation performed by the server subsystem 104. For example, for an online auction site, an auctioning service may generate an event message that confirms acceptance of a user's bid and later may generate an event message at the completion of the auction indicating the winning bid amount and whether a particular user has won the auction. The messages may include web code (e.g., HTML, JAVASCRIPT) that instructs a browser agent on a client computer 108 to render an updated auction page alerting the user 110 of that client computer 108 of the results of the auction, for example.

In some implementations, a session state service that stores session state data for users can be provided on one or more of the service subsystems 104a-n. The session state service reconciles session state data across multiple channels associated with a user 110 so that changes submitted by at one user agent are automatically shared across all other active channels associated with a user. The session state service can receive session state data in an API call from a first user agent, update stored session state data associated with the user of the first user agent based on the receive data, and generate an event message that represents the updated session state. The event message is published by the event hub 106 and pushed by the API gateway 102 to user agents across all channels associated with the user of the first user agent. In some implementations, the session state service facilitates synchronization of session state data with respect to changes that occur before a user has formally submitted data that would be processed by a service other than the session state service. For instance, as a user is typing information into form fields in a first user agent, the first user agent may automatically transmit API calls to the session state service after every n (e.g., 1, 2, 3, 4, or more) characters are entered, where the transmitted API calls indicate text that the user has entered into the form fields. The session state service processes the pre-submission updates and generates event messages which, upon being consumed by the API gateway 102, are pushed to user agents on other active channels for the same user. In some implementations, the event messages pushed on the other active channels may include instructions that cause the user agents on these channels to automatically update the data populated in their form fields to match the data entered in the form fields at the first user agent.

Additionally, in some implementations, the system may grant permission to a third-party user to observe or participate in (e.g., edit) a shared session of a first user. For example, a customer service representative for an organization that operates a service platform may request authorization from a first user to participate in a shared session with the first user. If the first user authorizes the request, then the API gateway 102 may associate the first user's session with the authorized third-party user (e.g., the customer service agent). As a result, the gateway 102 will then push event messages representing updated session state data to the third-party user, just as the event messages are also pushed to each user agent of the first user.

In some implementations, event messages from each of the service subsystems 104a-n are pushed to an events hub 106. The events hub 106 is configured to receive streams of messages from the service subsystems 104a-n, process the messages, and make the messages available to one or more consuming services. Consuming services can subscribe to message streams from the events hub 106 so that, when a message is published within a particular stream for which a consuming service has subscribed, the events hub 106 pushes the message to that consuming service. In some implementations, the events hub 106 stores event messages from the services subsystems 108a-n within an events record log.

Messages published by the events hub 106 may include, in addition to the message body, a header containing information that allows consuming services to efficiently process, discriminate, or discard the messages. In some implementations, the header includes one or more of a stream ID, a topic ID, a service ID, and a user ID. As an example, the events hub 106 may publish many streams of data having a range of topics. The events hub 106, consuming services 114a-n, or both, may filter which messages are pushed to, and/or processed by, a given consuming service 114 based on the stream and/or topic IDs of the messages and subscription preferences of the consuming services 114a-n. The service ID indicates which backend service or service subsystem 104 an event message originated from. The user ID indicates a particular user 110 that the message is addressed to, i.e., the intended recipient of the message. In some implementations, multiple user IDs may be specified to name multiple addressees for a message. In some implementations, the events hub 106 appends headers to event messages originating for the service subsystems 104a-n. In some implementations, the event messages that originate from the service subsystems 104a-n may already include headers so that the events hub 106 is not required to append headers to the message bodies.

As described in further detail below, the reactive API gateway 102 may itself be a consuming service that subscribes to one or more message streams from the events hub 106. Additional consuming services may be implemented on consuming subsystems 114a-n. For example, a first consuming subsystem 114a may provide a fraud detection service that analyzes one or more streams of event messages to identify potential instances of fraud or other malicious activities. The fraud detection service may analyze individual event messages and patterns of event messages to identify instances of fraud. In some implementations, if potential fraud or other malicious activity is detected, the fraud detection service alerts the reactive API gateway 102. The gateway 102 can then push the alerts to one or more user agents 112, terminate active connections with one or more user agents 112 that are implicated in the fraud, or both. As another example, a second consuming subsystem 114b may implement a service that pushes notifications to users based on event messages published by the events hub 106. The notifications may be pushed, for example, to notification services that present user notifications within a smartphone operating system, personal assistant applications, or social media applications.

The API gateway 102 further includes an events hub interface 102d. The events hub interface 102d receives messages streamed from the events hub 106 and, in some implementations, filters the received messages such that the gateway 102 only consumes messages within particular streams and/or messages relating to particular topics.

The API gateway 102 also maintains an active session log 102b, which tracks all the connections that are currently active (open) between the API gateway 102 and user agents 112a-n. In some implementations, the active session log 102b identifies which user 110 and which user agent 112 is associated with each active connection to the API gateway 102. The active session log 102b can then be used to determine which user agents should be pushed a given event message received from the events hub 106. For instance, an event message consumed by the API gateway 102 from the events hub 106 may include a user ID in a message header. The gateway 102 reads the user ID from the message header and identifies every active channel between the API gateway 102 and user agents 112 that is associated with the particular user 110 indicated by the user ID. The gateway 102 then pushes the event message to each of the identified user agents 112 that are associated with the particular user 110 indicated by the user ID.

In some implementations, the API gateway 102 maintains a blacklist 102c of users that are at least temporarily banned from establishing or maintaining connections with the API gateway 102 or using any of the backend services of service subsystems 104a-n. User may be automatically or manually added to the blacklist 102c for various reasons. For example, if a fraud detection service identifies that user 110b has likely committed fraud or other malicious activity, then user 110b may be added to the blacklist 102c. In some implementations, the API gateway 102 checks the blacklist 102c when it receives a request from a user agent 112 to establish a new connection for an API call. If a user 110 associated with the user agent 112, or if the user agent 112 itself, is identified in the blacklist 102c, the gateway 102 may reject the request and block a connection from being established with the requesting user agent 112. In some implementations, the API gateway 102 may periodically check the blacklist 102c and compare the list of blacklisted users to a list of users identified in the active session log 102b. If the gateway 102 determines based on the comparison that any blacklisted users are currently connected to the gateway 102, the gateway 102 may automatically and immediately terminate all connections between the gateway 102 and user agents 112 associated with the blacklisted users. Likewise, when a new user is added to the blacklist 102c, the gateway 102 may check the active session log 102b and terminate any active connections with the blacklisted user. In some implementations, the API gateway 102ca may terminate connections with blacklisted users even if the blacklisted user still has a valid, unexpired token that otherwise authorizes communication with the API gateway 102.

Figure 2:
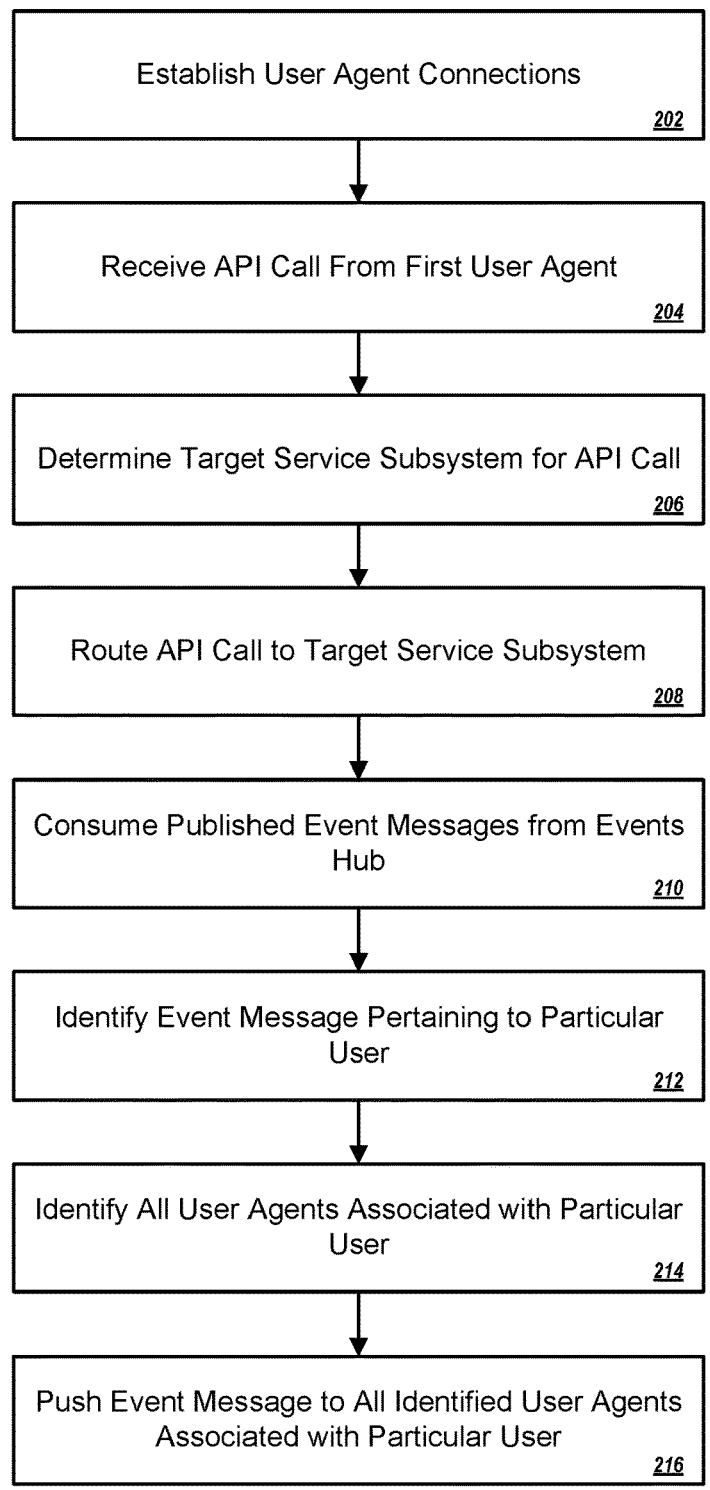
FIG. 2 is a flowchart of an example computer-implemented process for processing API calls by a reactive API gateway.
Figure 3:
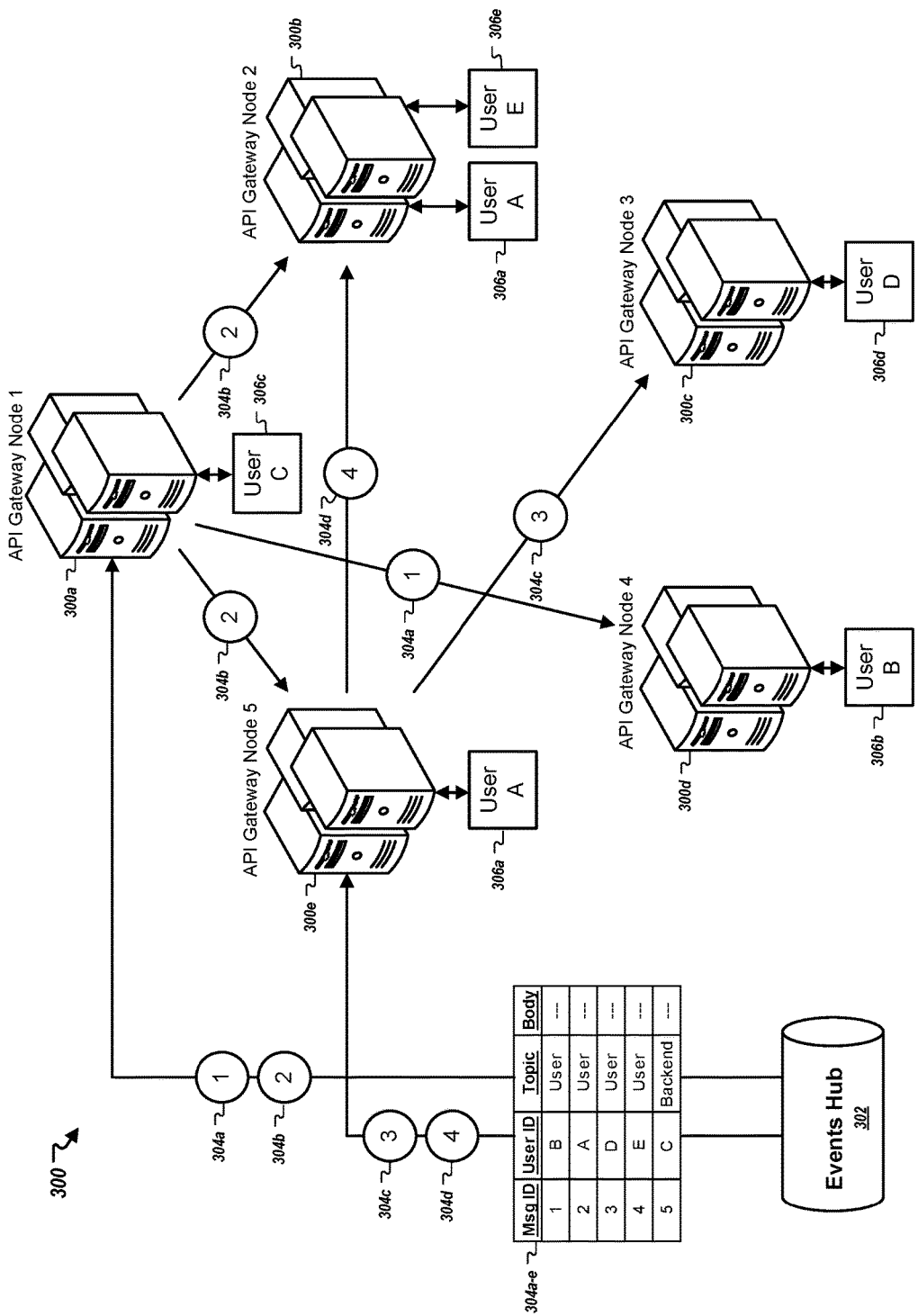
FIG. 3 illustrates an example distributed reactive API gateway that shares messages from an events hub with gateway nodes that are configured to push the messages to connected user agents.

FIG. 2 is a flowchart of an example process 200 for processing API calls by a reactive API gateway. In some implementations, the process 200 is carried out by a system of one or more computers in one or more locations, e.g., reactive API gateway 102 (FIG. 1) or reactive API gateway 300 (FIG. 3). The reactive API gateway may be deployed in a services platform that integrates a set of service subsystems to perform a range of services for end users.

At stage 202, the API gateway establishes connections with user agents at one or more client computers. Each user agent or client computer may be associated with a particular user. In some instances, the same user may establish respective connections with the API gateway through multiple different user agents. When a connection is established with a user agent, the connection may be held open for a specified amount of time, e.g., by issuing a token to the user agent that has a limited life span, e.g., a time-to-live (TTL) value. The API gateway may store context for each open connection that identifies the user, user agent, and/or client computer associated with the connection.

At stage 204, the API gateway receives an API call from a first user agent connected to the API gateway. At stage 206, the API gateway selects a target service subsystem, from among multiple service subsystems registered with the API gateway, for the received API call. The API gateway may select the target service subsystem by identifying a match between the received API call and API calls that the target subsystem has registered with the gateway.

At stage 208, the API gateway routes the received API call to the target service subsystem. The target service subsystem may process the API call in any suitable manner. For example, if the API call is a request to make an online purchase, the target service subsystem may perform one or more operations to complete the purchase according to any parameters specified in the API call or parameters associated with a session in which the API call was submitted. The target service subsystem may generate an event message indicating a result of one or more operations performed in response to the API call, and transmits the event message to an events hub, e.g., events hub 106. The events hub publishes the event message to make it available to one or more consuming services, including the reactive API gateway.

At stage 210, the reactive API gateway consumes the event message published by the events hub that originated from the target service subsystem. The event message may include data identifying a user, a user agent, and/or a client computer associated with the event message. In some implementations, if the event message identifies a particular user associated with the event message, then at stage 212, the API gateway identifies the particular user. At stage 214, the API gateway identifies, e.g., using an active connections log, all user agents associated with the particular user that are currently connected to the API gateway. At stage 216, the API gateway then transmits the event message to each of the user agents that are connected to the API gateway and are associated with the particular user.

In some implementations, the reactive API gateway can be implemented in a distributed system. FIG. 3 illustrates an example reactive API gateway 300 implemented in a distributed architecture. The distributed API gateway 300 includes multiple gateway nodes, as represented by nodes 300*a-e*. Each of the nodes 300*a-e* may include one or more computers. In some implementations, the nodes 300*a-e* are geographically separated, such as if the nodes are located at different data centers that are broadly configured to handle network traffic within respective geographic regions of the data centers. To reduce the load on each of the nodes 300*a-e*, user agents may connect to the API gateway 300 by connecting to only one of the nodes 300*a-e*. In some implementations, the system is configured to connect a user agent to the gateway node that is located closest to the user agent, or based on a region in which the user agent (or the client computer on which the user agent is operated) is located. However, because each user agent may not be simultaneously connected to every node in the distributed API gateway 300, the nodes 300*a-e* may interact with each other to coordinate API call processing and event message processing to afford a seamless experience for connected users.

As described with respect to FIGS. 1 and 2, the reactive API gateway may subscribe to one or more message streams from an events hub, e.g., events hub 302. In practice, the events hub 302 may process large quantities of messages and have a high throughput of event messages for consumption by the API gateway. In order to efficiently distribute the potentially high volume of event messages at each node in the distributed gateway 300, each of the nodes 300*a-e* may initially receive only a respective portion of all the event messages published by the events hub 302 within the API gateway's subscribed streams. However, some of the messages in the respective sub-streams received by each of the nodes 300*a-e* may be directed to users who are connected to the API gateway 300 at one or more nodes other than the node at which the messages were initially received. Therefore, the gateway nodes 300*a-e* may be configured to coordinate with each other to deliver event messages received in the respective sub-streams to the appropriate nodes for the users connected at each node.

In general, the nodes 300*a-e* of the distributed API gateway 300 may employ a strict consistency strategy or an eventual consistency strategy to synchronize information about which users or user agents are connected to each node 300-*a-e* at a given time. The nodes 300*a-e* can then route event messages from the events hub 302 to the appropriate node(s) that can push the event messages to the addressed user. In some implementations, the strict consistency strategy is a Paxos consensus algorithm. In some implementations, the strict consistency strategy is a Raft consensus algorithm. In some implementations, the eventual consistency strategy may be based on a DYNAMO™ technology.

As illustrated in FIG. 3, by way of example, the events hub 302 outputs a stream of messages 304*a-e*. Each message includes a message ID, a user ID indicating the end user to whom the message is addressed, a topic, and a message body. Other message formats that include values for additional, fewer, or different combinations of parameters may also be suitable in some implementations. A first sub-stream of messages 304*a* and 304*b* (message IDs 1 and 2) are initially provided to gateway node 1 (300*a*). A second sub-stream of messages 304*c* and 304*d* (message IDs 3 and 4) are initially provided to gateway node 5 (300*e*). The gateway 300 may discard message 5 (304*e*) because it is deemed to be related to a topic (backend) that has not been selected to be pushed to the user agents.

Gateway node 1 (300*a*) is connected to a user agent for User C (306*c*). However, the sub-stream of messages 304*a* and 304*b* initially received by gateway node 1 (300*a*) are addressed to users B and A, respectively. As such, gateway node 1 (300*a*) forwards message 2 (304*b*) to gateway node 2 (300*b*) and to gateway node 5 (300*e*) where User A (306A) is connected. Gateway nodes 2 and 5 (300*b* and 300*e*) may then push message 2 (304*b*) to each of the user agents that have active connections for User A (306A). Similarly, gateway node 1 (300*a*) forwards message 1 (304*a*) to gateway node 4 (300*d*) where User B (306*b*) is connected. Gateway node 4 (300*d*) may then push message 1 (304*a*) to the active user agent for User B (306*b*).

Gateway node 5 (300e) may process its respective substream of messages 304c and 304d in a like manner as gateway node 1 (300a). For example, using a strict or eventual consistency strategy, node 5 determines that the addressees of messages 304c and 304d, i.e., User D (306d) and User E (306e), are currently connected to gateway nodes 3 and 2, respectively. In response, node 5 (300e) forwards messages 3 (304c) and 4 (304d) to nodes 3 (300c) and 2 (300b), respectively, so that the messages can then be pushed to their respective end users.

Figure 4:
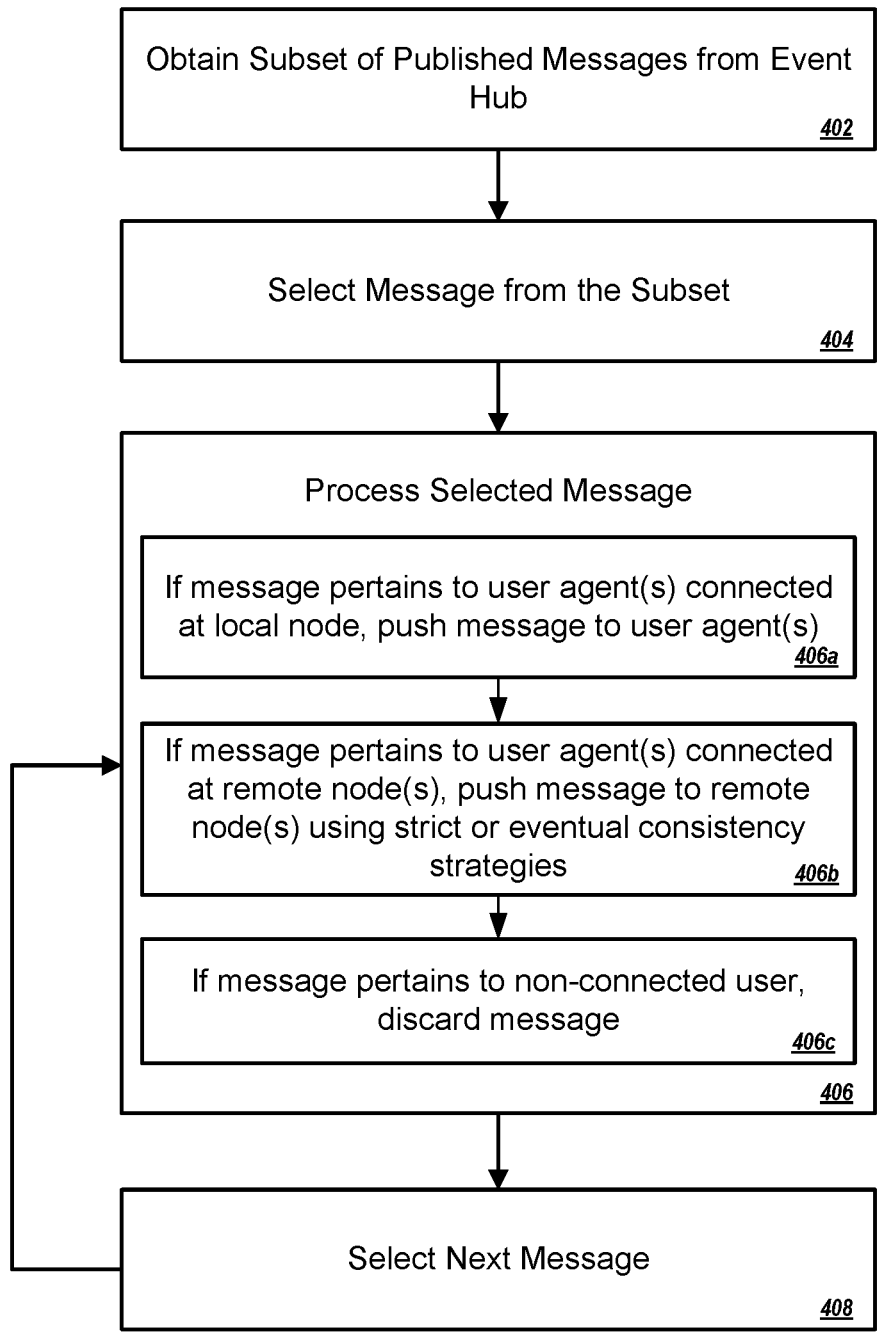
FIG. 4 is a flowchart of an example computer-implemented process for processing event messages at a node in a distributed API gateway.

FIG. 4 is a flowchart of an example process 400 for processing event messages at a node in a distributed reactive API gateway. The process 400 may be carried out by a node in a distributed computing system, such as any of the nodes 300a-e described with respect to FIG. 3.

At stage 402, a first gateway node obtains a subset of messages (e.g., a sub-stream) published by an events hub, e.g., events hub 302. At stage 404, the first node selects a message from the subset. At stage 406, the first node determines an action to take with respect to the selected message. If the message is addressed to a user that is connected via a user agent to the first node, then the first node pushes the message to the user agent (stage 406a). If the message is addressed to a user that is connected via user agents at one or more nodes other than the first node, then the first node forwards the message to the one or more other nodes, which in turn push the message to the connected user agents (stage 406b). The first node may identify that the addressed user is connected at other notes using a strict consistency technique (e.g., a Paxos or Raft consensus algorithm) or an eventual consistency technique. If a message is determined to pertain to a user that is not connected to the API gateway at any node, then the message may be discarded because a user agent is not currently available to push the message to for the intended recipient. Alternatively, the gateway may store the message for a limited time if the user is not immediately available. If the user later establishes a connection with the API gateway, the message may be pushed to the user upon identifying that the user has established the connection.

Figure 5:
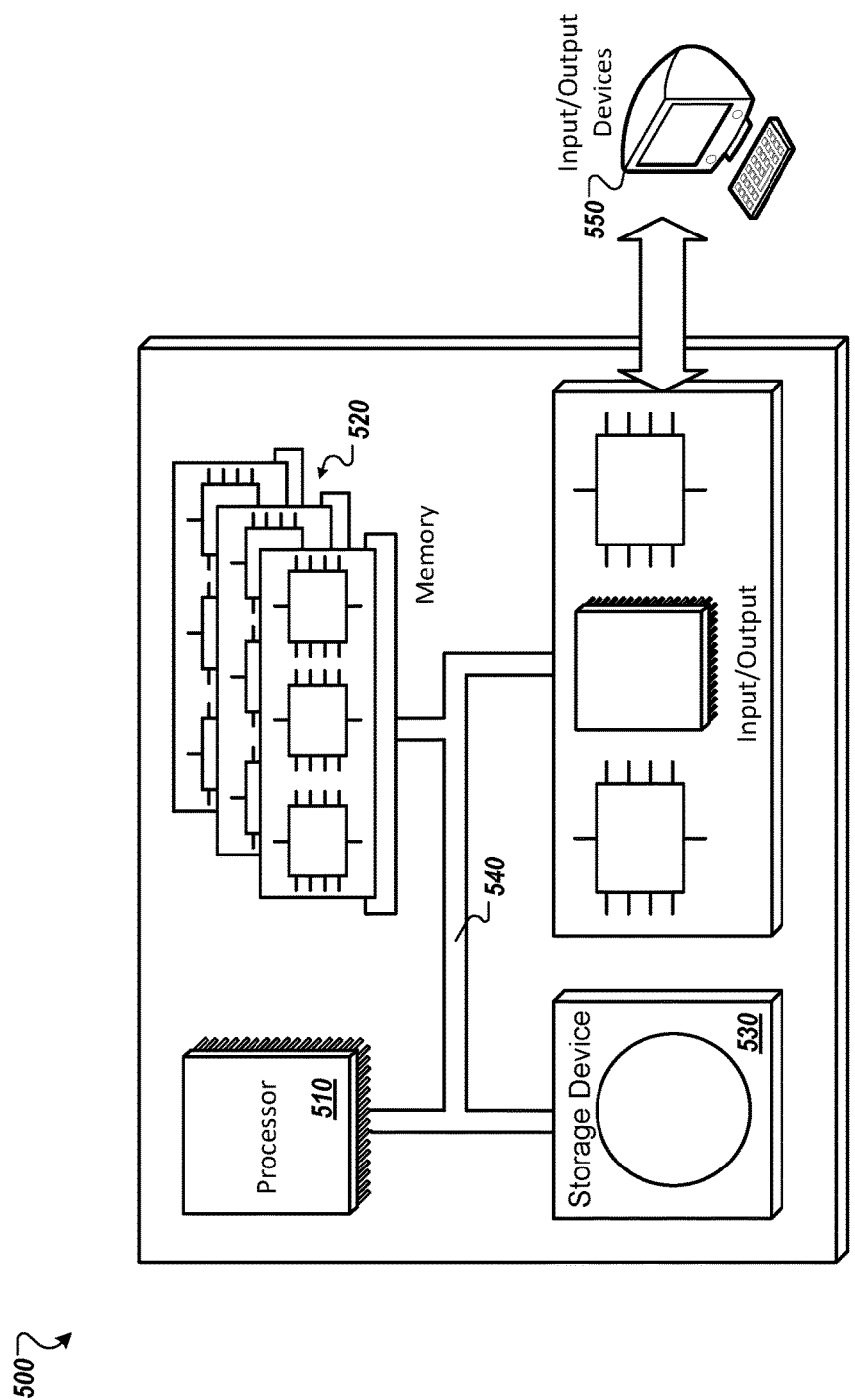
FIG. 5 is a schematic diagram of a computer system, which can be used to carry out the operations described in association with the computer-implemented methods, systems, devices, and other techniques described herein.

FIG. 5 is a schematic diagram of a computer system 500. The system 500 can be used to carry out the operations described in association with any of the computer-implemented methods, systems, devices, and other techniques described previously, according to some implementations. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In some implementations, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for processing application programming interface (API) calls, the method comprising:

establishing, by a first system of one or more computers, connections with a plurality of user agents at one or more client computers, wherein the first system is configured as a proxy between the plurality of user agents and a plurality of service subsystems that provide respective online services;

receiving, by the first system, an API call from a first user agent of the plurality of user agents to which the first system is connected, the first user agent associated with a first user;

routing, by the first system, the received API call to a particular service subsystem of the plurality of service subsystems, thereby causing the particular service subsystem (i) to perform an operation based on the received API call and (ii) to provide to a messaging system an event message that describes a result of the particular service subsystem's performance of the operation based on the received API call, wherein the first system routes the received API call to the particular service subsystem based on identifying that the particular service subsystem is configured to handle API calls of a same type as the received API call, and wherein the messaging system is communicably coupled with each of the plurality of service subsystems and is configured to publish event messages received from each of the plurality of service subsystems including the particular service subsystem to a plurality of consumer systems including the first system, so that the plurality of consumer systems receive event messages generated by the plurality of service subsystems from the messaging system rather than directly from the plurality of service subsystems;

receiving, by the first system and from the messaging system rather than directly from the particular service subsystem, the event message that was generated by the particular service subsystem and that describes the result of the particular service subsystem's performance of the operation based on the received API call, wherein the messaging system addresses the event message to the first user;

in response to receiving the event message that is addressed to the first user:

identifying, by the first system, one or more user agents associated with the first user; and providing the event message from the first system to the one or more user agents associated with the first user.

2. The computer-implemented method of claim 1, wherein the messaging system is implemented at an events hub that is configured as a messaging intermediary between the plurality of service subsystems and the plurality of consumer systems.

3. The computer-implemented method of claim 1, wherein the first system is an API gateway that is configured to intercept API calls directed to the plurality of service subsystems and to route each intercepted API call to a respective service subsystem of the plurality of service subsystems that is determined to correspond to the intercepted API call.

4. The computer-implemented method of claim 1, wherein the one or more user agents associated with the first user include at least one user agent that is distinct from the first user agent.

5. The computer-implemented method of claim 1, wherein the one or more user agents associated with the first user include the first user agent and a second user agent that are located on different client computers.

6. The computer-implemented method of claim 5, wherein at least one of the first user agent or the second user agent is a web browser application on a mobile client computer or a desktop client computer.

7. The computer-implemented method of claim 1, wherein establishing connections with the plurality of user agents comprises establishing connections with one or more user agents that are associated with a second user; and
the method further comprises:
identifying that the second user has been added to a blacklist of users that are blocked from maintaining connections with the first system; and
in response to identifying that the second user has been added to the blacklist, automatically terminating the connections with the one or more user agents that are associated with the second user.

8. The computer-implemented method of claim 1, wherein the API call comprises a request to store form field data that has been partially entered at the first user agent, but that has not yet been submitted.

9. A computing system including one or more computers having memory and one or more processors, the computing system comprising:
a gateway subsystem, including one or more computers, configured to route application programming interface (API) calls submitted by user agents connected to the gateway subsystem to appropriate service subsystems of a plurality of service subsystems that provide respective online services to the user agents based on respective types of the API calls, wherein the gateway subsystem is arranged as a proxy between the user agents that are connected to the gateway subsystem and the plurality of service subsystems; and
an events hub, including one or more computers, configured to receive event messages from at least some of the plurality of service subsystems and to publish the received event messages for consumption by one or more consuming subsystems including the gateway subsystem, such that the one or more consuming subsystems indirectly receive event messages from the at least some of the plurality of service subsystems through the events hub rather than directly from the at least some of the plurality of service subsystems,
wherein at least a first published event message that is consumed by the gateway subsystem identifies a first user,
wherein the at least the first published event message is generated by one of the plurality of service subsystems to describe a result of the service subsystem's performance of an operation responsive to an API call that was routed to the service subsystem from the gateway subsystem; and
wherein the gateway subsystem is further configured, in response to consuming the first published event message that identifies the first user:

(i) to determine every user agent that is associated with the first user and that is currently connected to the gateway subsystem, and
(ii) to transmit information that represents the first published event message to every user agent that is determined to be associated with the first user and currently connected to the gateway subsystem.

10. The computing system of claim 9, wherein the gateway subsystem is further configured to:
identify a second user that has permission to access an online session of the first user, and
based on identifying that the second user has permission to access the online session of the first user, transmit information that represents the first published event message to one or more user agents that are determined to be associated with the second user and that are currently connected to the gateway subsystem.

11. The computing system of claim 10, wherein the second user is a customer support representative or an information technology specialist.

12. The computing system of claim 9, wherein the information that represents the first published event message is the first published event message.

13. A gateway system for processing application programming interface (API) calls, comprising:
one or more processors; and
one or more computer-readable media encoded with instructions that, when executed by the one or more processors, cause the one or more processors to perform operations comprising:
establishing, by the gateway system, connections with a plurality of user agents at one or more client computers, wherein the gateway system is configured as a proxy between the plurality of user agents and a plurality of service subsystems that provide respective online services;
receiving, by the gateway system, an API call from a first user agent of the plurality of user agents to which the gateway system is connected, the first user agent associated with a first user;
routing, by the gateway system, the received API call to a particular service subsystem of the plurality of service subsystems, thereby causing the particular service subsystem (i) perform an operation based on the received API call and (ii) to provide to a messaging system an event message that describes a result of the particular service subsystem's performance of the operation based on the received API call,
wherein the gateway system routes the received API call to the particular service subsystem based on identifying that the particular service subsystem is configured to handle API calls of a same type as the received API call, and
wherein the messaging system is communicably coupled with each of the plurality of service subsystems and is configured to publish event messages received from each of the plurality of service subsystems including the particular service subsystem to a plurality of consumer systems including the gateway system, so that the plurality of consumer systems receive event messages generated by the plurality of service subsystems from the messaging system rather than directly from the plurality of service subsystems;
receiving, by the gateway system and from the messaging system rather than directly from the particular service subsystem, the event message that was generated by the particular service subsystem and that describes the result of the particular service subsystem's performance of the operation based on the received API call, wherein the messaging system addresses the event message to the first user;

in response to receiving the event message that is addressed to the first user:
  identifying, by the gateway system, one or more user agents associated with the first user; and
  providing the event message from the gateway system to the one or more user agents associated with the first user.

14. The gateway system of claim 13, wherein the gateway system is configured to intercept API calls directed to the plurality of service subsystems and to route each intercepted API call to a respective service subsystem of the plurality of service subsystems that is determined to correspond to the intercepted API call.

15. The gateway system of claim 13, wherein the messaging system is implemented at an events hub that is configured as a messaging intermediary between the plurality of service subsystems and the plurality of consumer systems.

16. The computer-implemented method of claim 1, further comprising, in response to receiving the event message that is addressed to the first user:
  determining, by the first system, that multiple user agents associated with the first user, including the first user agent, are currently connected to the first system; and
  providing the event message from the first system to each of the multiple user agents associated with the first user.

17. The computer-implemented method of claim 1, wherein the plurality of service subsystems independently provide services for a same website.

18. The computer-implemented method of claim 1, wherein the messaging system is configured to publish event messages that the messaging system receives from multiple ones of the plurality of service subsystems to the plurality of consumer systems including the first system.

19. The gateway system of claim 13, wherein the operations further comprise:
  determining, by the gateway system, that multiple user agents associated with the first user, including the first user agent, are currently connected to the gateway system; and
  providing the event message from the gateway system to each of the multiple user agents associated with the first user.

20. The computer-implemented method of claim 1, wherein the one or more user agents associated with the first user includes the first user agent.

21. The computer-implemented method of claim 16, wherein the first system includes multiple computers in a distributed architecture that includes a plurality of nodes of computers; and
  determining that the multiple user agents associated with the first user are currently connected to the first system comprises performing a consensus technique to achieve strict consistency or eventual consistency of user agent data among the plurality of nodes.

22. The computer-implemented method of claim 16, wherein determining that the multiple user agents associated with the first user are currently connected to the first system comprises performing a lookup in a connections log that associates each active user-agent connection with a corresponding user identifier that indicates which user is associated with the active user-agent connection.

* * * * *

UNITED STATES PATENT AND TRADEMARK OFFICE
CERTIFICATE OF CORRECTION

PATENT NO. : 10,193,992 B2
APPLICATION NO. : 15/469147
DATED : January 29, 2019
INVENTOR(S) : Dominik Wagenknecht et al.

Page 1 of 1

It is certified that error appears in the above-identified patent and that said Letters Patent is hereby corrected as shown below:

On the Title Page

Column 2 Item (57) (Abstract), Line 10, delete "the the" and insert -- the --.

In the Claims

Column 18, Line 44, in Claim 13, delete "(i)" and insert -- (i) to --.

Signed and Sealed this
Seventh Day of May, 2019

Andrei Iancu
*Director of the United States Patent and Trademark Office*